March 17, 1959 P. H. L. ANTONISSEN 2,877,622
HEAT ENGINES
Filed Nov. 18, 1954 2 Sheets-Sheet 1

Inventor
P. H. L. Antonissen
By Jesmeth Downing Hubble
Attys.

March 17, 1959 P. H. L. ANTONISSEN 2,877,622
HEAT ENGINES

Filed Nov. 18, 1954 2 Sheets-Sheet 2

Inventor
P. H. L. Antonissen
By Glascock Downing Seebold
Attys.

United States Patent Office 2,877,622
Patented Mar. 17, 1959

2,877,622

HEAT ENGINES

Peter Honoré Louis Antonissen, London, England, assignor to Associated British Oil Engines Limited, London, England Application November 18, 1954, Serial No. 469,764

13 Claims. (Cl. 60—13)

This invention relates to reciprocating internal combustion engines in which it is the normal practice for substantially all the air to be used in the combustion chamber to pass through all the stages and/or cycles of the engine.

An object of the present invention is to enable the size of inter- and after-coolers and heat exchangers as well as turbines and compressors to be reduced and their efficiency to be increased.

The invention consists in a reciprocating internal combustion engine having features as set forth in the claims appended hereto.

In a typical example as applied to a diesel engine where the compressor is engine driven, highly compressed air from the compressor is passed through a cooler and then expanded and mixed with atmospheric air in or before entering the cylinder of the engine, i. e. the compressor only handles part of the total air required and can thus be smaller than would otherwise be required.

The cooler deals with a smaller quantity of air than is usual, and since it is compressed at a higher pressure than that required for charging, the corresponding increase in temperature results in the air cooler operating at higher efficiency. The expansion of this high pressure air is arranged to compress the additional air which makes up the full charge required and the final temperature of the mixture is lower than normally obtains.

According to another example as applied to a Diesel engine, the compressor, which may be a multi-stage compressor, is driven by a turbine operated by engine exhaust gases, a heat exchanger being provided between the compressor (and between stages of the compressor, if of multi-stage type) and an expansion device which communicates with a mixing device in which latter the expanded high pressure air mixes with the induced non-compressed or slightly compressed air to make up the complete charge; the mixing device is connected to the engine inlet manifold.

The expansion of the high-pressure air, compression of the make-up air and their admixture may be effected by passing the high pressure air through a turbine through the blades of which expansion occurs followed by mixing with the make-up air.

Referring to the accompanying diagrammatic drawings.

Figure 1:
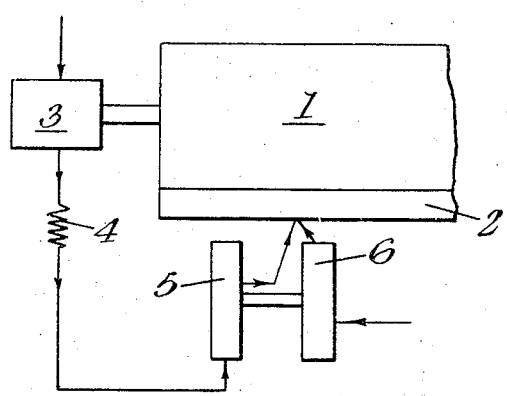
Figure 1 illustrates a reciprocating-piston internal combustion engine arrangement embodying the present invention in one form.

As shown in Figure 1, the high-pressure air from a compressor 3 (driven by a diesel engine 1) after passing through a cooler 4 is caused to drive a turbine 5 coupled to a low-pressure compressor 6 for the make-up air, the expanded high-pressure air and make-up air being then mixed before entering the engine manifold 2.

Figure 2:
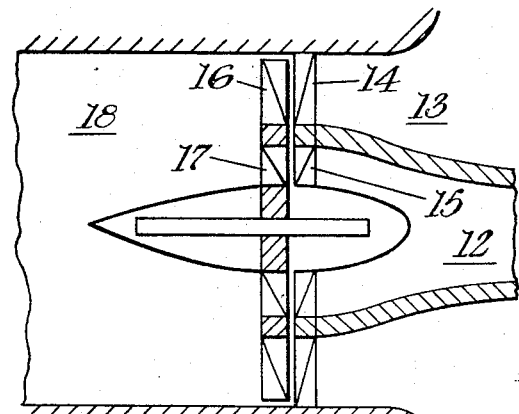
Figure 2 illustrates a single rotor compressor suitable for use in connection with the present invention.

If desired, as shown in Figure 2, a single rotor arrangement comprising two sets of blades superimposed on each other may be employed, one set of blades 17 receiving the high pressure air entering through passage 12 and being driven thereby and the other set of blades 16 serving to increase the pressure of the make-up air from the atmosphere entering through passage 13, the mixing taking place within the rotor housing passage 18; fixed guide blades 14 are provided for the compressor and further fixed guide blades 15 for the air turbine. The arrangement shown in Figure 2 may replace the turbine 5 and compressor 6 of Figure 1.

The compressors in the examples shown in Figures 1 and 2 may be of the centrifugal type if desired.

If desired, the power required by the compressors may be augmented by power derived from an exhaust driven turbine, a direct connection to the engine or an external source of power.

Figure 3:
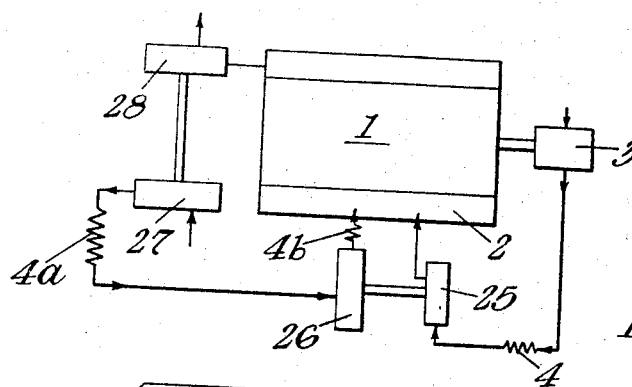
Figure 3 illustrates a further modified reciprocating piston internal combustion engine arrangement.

According to a further modification illustrated in Figure 3, an internal combustion prime mover 1 is fed with air from a mixing device constituted by the engine manifold 2 to which two supplies of air are passed as before. One of these is derived from a compressor 3 driven by the prime mover 1 after passing through a cooler 4 and cold air turbine 25. The turbine 25 is coupled to a compressor 26. The other air supply is obtained from the compressor 26 through a cooler 4b by way of a further compressor 27 driven by a turbine 28 operated by exhaust gases from the prime mover, and a further cooler 4a. The device of Figure 2 may replace the turbine 25 and compressor 26.

Figure 4:
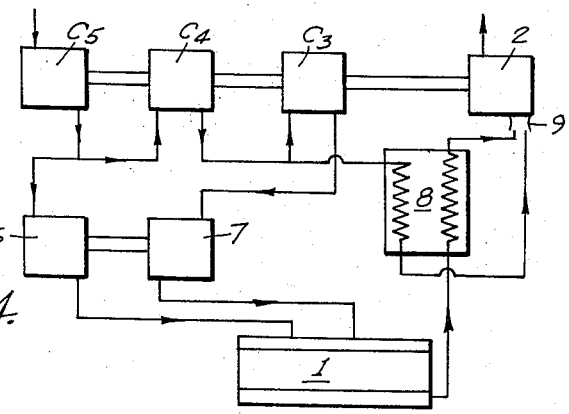
Figure 4 illustrates a still further modified reciprocating-piston internal combustion engine arrangement.

According to a further modification illustrated in Figure 4, three compressors $C_3$, $C_4$ and $C_5$ are driven by an exhaust operated turbine 2, but only part of the air from the first compressor $C_5$ is passed to the second compressor $C_4$, while part of the air from the compressor $C_4$ is passed to a nozzle associated with a venturi contraction 9, through which the exhaust gases pass to the turbine 2, the air en route to this nozzle being heated by the exhaust gases in the heat exchanger 8. The remainder of the air from the compressor $C_4$ is passed to the compressor $C_3$, from which it is led into a cold air turbine 7 driving a compressor $C_6$, which further compresses the remainder of the air from the compressor $C_5$. The compressor $C_6$ and the cold air turbine 7 deliver their air supplies to the manifold of the engine 1 where mixing takes place. The arrangement of Figure 2 may replace the compressor $C_6$ and the turbine 7.

Figure 5:
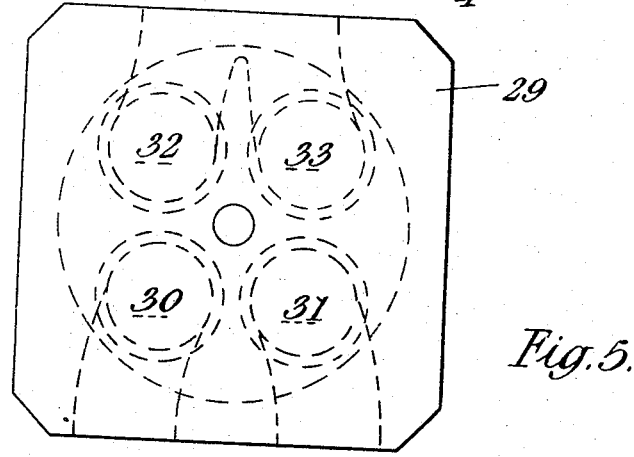
Figure 5 illustrates part of a reciprocating-piston internal combustion engine furnished with two inlet and two exhaust valves.

In order to effect the mixing of the high and low pressure air supply in the cylinder, in a further arrangement shown in Figure 5, a reciprocating internal combustion engine is supplied with two inlet valves 30, 31 and two exhaust valves 32, 33 suitably operated to give different timing to the inlet valves so that part of the air is drawn in or forced into the cylinder during part of the suction stroke and further parts of the air are supplied through the second or further valves at a higher pressure with appropriate timing. This device may be arranged so that the inlet valves receive air from the elements 5 and 6 of Figure 1, from the elements 25 and 26 of Figure 3, or from the elements $C_6$ and $C_7$ of Figure 4.

Porting arrangements may be provided in the cylinder for part of the air to be supplied whereas in addition the complementary air is supplied at a higher pressure through valves in the cylinder head.

Figure 6:
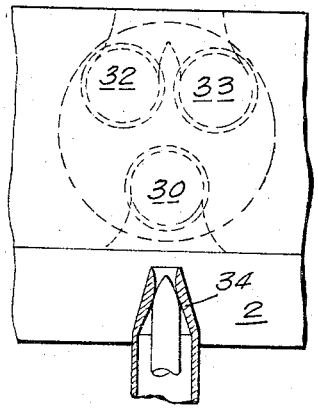
Figure 6 illustrates a reciprocating-piston internal combustion engine furnished with a single inlet valve, two exhaust valves and a controlled nozzle for each engine cylinders.

A further method of mixing the high and low pressure air is shown in Figure 6, where 34 is a nozzle fitted in the air inlet manifold 2 of a reciprocating internal combustion engine. The nozzle 34 is directed into the passage connecting the manifold 2 with the inlet valve 30; 32 and 33 being the exhaust valves. The nozzle 34 has a needle valve, as shown, or any other type of valve which is appropriately operated, so that a jet of high pressure air can be released from the nozzle just prior to the closing of the inlet valve, thus giving a final pressure boost to the air in the cylinder. This arrangement may be employed with the nozzle 34 replacing the turbine 5 of Figure 1, the turbine 25 of Figure 3, or the turbine 7 of Figure 4.

In a similar arrangement to that shown in Figure 4, the internal combustion engine exhausts into an exhaust gas turbine driving three compressors in series, the first compressor $C_5$ dealing with, say 10 pounds of air per second, the second compressor $C_4$ dealing with, say 5 pounds of air per second and the third compressor $C_3$ dealing with, say 3 pounds of air per second. In this case, however, air from the second turbine 7 is mixed in the engine manifold with air from the compressor $C_6$ to enter the prime mover in a single supply.

Between the first and second compressors $C_5$ and $C_4$, say 5 pounds of air per second is led off at two atmospheres pressure to the compressor $C_6$. Of the 5 pounds of air per second compressed by the second compressor $C_4$ only 3 pounds per second are led to the third compressor $C_3$ whereas 2 pounds of air per second from the compressor $C_4$ are heated to, say 660° F. and are then led into the nozzle 9 for mixing with the exhaust gases from the engine before the combined air and exhaust gases reach the exhaust gas turbine 2.

Although the engine exhaust temperature may be, say 1600° F., the inlet temperature to the gas turbine may be only, say 1450° F., due to mixing with air at 660° F.

I claim:

1. A reciprocating internal combustion engine arrangement, comprising means for supplying at a low pressure a part of the air to be used for combustion in the engine, means for compressing to a high pressure another part of the air to be used for combustion in the engine and derived from a source other than the above said means, means for expanding at least a part of the higher pressure air to cool said air, and means for mixing said expanded air with said lower pressure air prior to admission to the combustion chamber of the engine whereby an overall cooling effect is obtained.

2. An engine arrangement according to claim 1, in which the high pressure air compressing means comprises a compressor having an operative drive connection with the engine.

3. An engine arrangement according to claim 1, in which the means for expanding the air comprises a cold air turbine.

4. An engine arrangement according to claim 1, in which the means for expanding the air comprises a cyclically opening expansion nozzle.

5. An engine arrangement according to claim 1, in which the means for expanding the air comprises a power producing device having an operative drive connection with air compressing means for compressing a part of the air supplied to the engine combustion chamber.

6. An engine arrangement according to claim 1, in which the means for expanding the higher pressure air comprises a cold air turbine having an operative drive connection with a compressor supplying a part of the air to the engine combustion chamber.

7. An engine arrangement according to claim 1, comprising a heat exchanger through which the air from the high pressure air compressing means is passed before being admitted to the air expanding means.

8. An engine arrangement according to claim 1, in which the engine comprises a plurality of cylinders each having an inlet valve, and an inlet manifold communicating by respective passages with said inlet valves, in which the means for expanding the higher pressure air comprises a cyclically opening expansion nozzle directed into each of said passages.

9. An engine arrangement according to claim 1, in which the means for compressing the air to the higher pressure includes an exhaust-driven turbo charger associated with the engine.

10. A reciprocating internal combustion engine arrangement, comprising means for compressing a part of the air to be used for combustion in the engine to a high pressure, means driven by a turbine operated from the engine exhaust for supplying another part of the air to be used for combustion in the engine at a lower pressure, means for expanding at least a part of the higher pressure air to cool said air, and means for mixing said expanded air with said lower pressure air prior to admission to the combustion chamber of the engine whereby an overall cooling effect is obtained.

11. An engine arrangement according to claim 10, comprising means for heating a part of the air supplied at the lower pressure.

12. An engine arrangement according to claim 10, comprising means for heating a part of the air supplied at the lower pressure and delivering said heated air together with the engine exhaust gases to the turbine.

13. An engine arrangement according to claim 10, comprising a heat exchanger for heating a part of the air supplied at the lower pressure by heat exchange with the engine exhaust gases, and means including a venturi nozzle for delivering said heated air together with the engine exhaust gases to the turbine.

References Cited in the file of this patent

UNITED STATES PATENTS

| | | |
|---|---|---|
| 1,605,254 | Martell | Nov. 2, 1926 |
| 2,469,679 | Wyman | May 10, 1949 |
| 2,621,475 | Toy | Dec. 16, 1952 |
| 2,704,055 | Downing | Mar. 15, 1955 |
| 2,766,744 | Steiger | Oct. 16, 1956 |

FOREIGN PATENTS

| | | |
|---|---|---|
| 282,834 | Great Britain | Mar. 8, 1928 |
| 368,318 | Great Britain | Mar. 4, 1932 |
| 954,714 | France | June 13, 1949 |